(12) United States Patent
Park et al.

(10) Patent No.: US 7,065,020 B2
(45) Date of Patent: Jun. 20, 2006

(54) APPARATUS AND METHOD FOR COMPENSATING FOR TILT

(75) Inventors: Jee-hyung Park, Seoul (KR); Dong-ki Hong, Gyeonggi-do (KR); Soo-yul Jung, Gyeonggi-do (KR); Ju-wha Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 10/374,501

(22) Filed: Feb. 26, 2003

(65) Prior Publication Data

US 2003/0223336 A1 Dec. 4, 2003

(30) Foreign Application Priority Data

May 13, 2002 (KR) ................. 2002-26160

(51) Int. Cl.
*G11B 7/00* (2006.01)
(52) U.S. Cl. ................. 369/53.19; 369/53.34
(58) Field of Classification Search ............. 369/53.19, 369/44.32
See application file for complete search history.

(56) References Cited

U.S. PATENT DOCUMENTS

| 5,627,808 | A | | 5/1997 | Hajjar et al. | ............. | 369/44.32 |
| 5,898,654 | A | * | 4/1999 | Shimada et al. | ......... | 369/44.32 |
| 6,570,828 | B1 | * | 5/2003 | Kikuchi et al. | .......... | 369/44.32 |
| 2002/0054549 | A1 | * | 5/2002 | Ohtsu | ..................... | 369/44.32 |
| 2002/0080692 | A1 | * | 6/2002 | Nagaoka et al. | ......... | 369/44.32 |
| 2003/0142598 | A1 | * | 7/2003 | Chou et al. | ............. | 369/44.32 |

FOREIGN PATENT DOCUMENTS

| JP | 2001-093178 | 4/2001 |
| JP | 2001-195763 | 7/2001 |
| JP | 2002-050063 | 2/2002 |

OTHER PUBLICATIONS

Office Action dated Oct. 12, 2004 in corresponding Japanese Patent Application No. 2003-099333.

* cited by examiner

*Primary Examiner*—Andrea Wellington
*Assistant Examiner*—Lixi Chow
(74) *Attorney, Agent, or Firm*—Staas & Halsey LLP

(57) ABSTRACT

A method for compensating for tilt in reproducing an optical reproducing medium is performed by determining an initial tilt driving direction so as to not interrupt a reproducer when tilt compensation is performed on the optical recording medium. The tilt compensation method involves comparing the amount of jitter detected over a certain period of time when the optical recording medium is reproduced with a reference value; determining the direction of tilt compensation in the direction of reproducing a track of the optical recording medium, before performing tilt compensation, when the amount of jitter detected, according to a comparison result of the comparator, exceeds a reference value; and resuming reproduction of the optical recording medium after performing tilt compensation so that the jitter decreases in the direction of the determined tilt compensation.

27 Claims, 3 Drawing Sheets

APPARATUS AND METHOD FOR COMPENSATING FOR TILT

CROSS-REFERENCE TO RELATED APPLICATION

This application claims the benefit of Korean Application No. 2002-26160, filed May 13, 2002 in the Korean Intellectual Property Office, the disclosure of which is incorporated herein by reference.

BACKGROUND OF THE INVENTION

1. Field of the Invention

The present invention relates to an apparatus and a method of reproducing an optical recording medium and more particularly, to an apparatus and a method of compensating for tilt by determining an initial tilt driving direction so as to not interrupt the operations of a reproducer when tilt compensation is performed during reproduction of an optical recording medium.

2. Description of the Related Art

It is possible to effectively read signals recorded on an optical recording medium by maintaining the surface of the optical recording medium perpendicular to a pickup unit. However, while not ideal, it is understood that the optical recording medium will be tilted to some extent in a manufacture process, during usage, etc. Since the recording surface of the optical recording medium cannot be maintained perpendicular to the pickup unit in a tilted state, an apparatus which compensates for the tilt is used to account for the tilt.

The apparatus which compensates for the tilt maintains the pickup unit completely perpendicular to the recording medium by driving a tilt motor to rotate the pickup unit to correspond to the tilt state of the recording surface in one direction or an opposite direction.

Most optical recording media having a tilt are shaped like a dish. If the tilt compensation is performed when the optical recording medium in the dish shape is reproduced or seek operations are completed, a tilt driver moves in the direction in which there is increased jitter or in the direction of decreased jitter in order to determine the directions in which jitter is decreased or increased. Here, the tilt driver has a 50% probability of operating in the direction in which jitter is increased. The tilt driver moves in the directions in which jitter is increased or decreased, searches the direction in which jitter is decreased, and compensates for tilt. Accordingly, there is an increase in the time needed for a tilt driver to search for the direction to compensate for the tilt, and a reproducer becomes unstable.

SUMMARY OF THE INVENTION

Accordingly, the invention provides an apparatus which compensates for tilt by determining an initial tilt driving direction, in consideration of the structure of the optical recording medium so as to not interrupt the operations of a reproducer when tilt compensation is performed during reproduction of an optical recording medium to reduce a deterioration of the signals reproduced from the optical recording medium.

The invention provides a method of compensating for tilt by determining an initial tilt driving direction, in consideration of the structure of an optical recording medium so as to not interrupt the operations of a reproducer when tilt compensation is performed during reproduction of the optical recording medium to reduce deterioration of the signals reproduced by the optical recording medium.

Additional aspects and/or advantages of the invention will be set forth in part in the description which follows and, in part, will be obvious from the description, or may be learned by practice of the invention.

In an aspect, the invention provides an apparatus to compensate tilt in an optical recording medium driver, the apparatus comprising an optical pickup unit to generate a reproduction signal using an optical recording medium; a tilt adjuster to adjust the tilt of the optical pickup unit; a jitter detector to detect an amount of jitter in the reproduction signal; and a tilt controller which, when an amount of the jitter detected over a certain period of time exceeds a reference value during reproduction of the optical recording medium, controls a tilt compensation in a direction in which an amount of the jitter decreases after adjusting the operational direction of the tilt adjuster in a direction towards/away from a track of the optical recording medium to be reproduced prior to performing tilt compensation.

In another aspect, the invention provides an apparatus which compensates for tilt in an optical recording medium driver, the apparatus comprising an optical pickup unit to generate a reproduction signal using an optical recording medium; a tilt adjuster to adjust the tilt of the optical pickup unit; a jitter detector to detect an amount of jitter in the reproduction signal; and a tilt controller which, when an amount of the jitter detected in a target track exceeds a fixed value when the optical recording medium is reproduced, controls tilt compensation in a direction towards/away from a track of an optical recording medium being reproduced, before performing tilt compensation.

In yet another aspect, the invention provides a method of compensating for tilt in an apparatus for driving an optical recording medium, the method comprising comparing a reference value with an amount of jitter detected over a certain period of time when the optical recording medium is reproduced; before performing tilt compensation and when the amount of jitter detected exceeds the reference value, determining a direction of tilt compensation to be in a direction towards/away from a track of the optical recording medium to be reproduced; and resuming reproduction of the optical recording medium after performing tilt compensation so that the amount of the jitter decreases in the direction of the determined tilt compensation.

In another aspect, the invention provides a method of compensating for tilt in an apparatus for driving an optical recording medium, the method comprising where a track moves beyond a predetermined value when the optical recording medium is reproduced, comparing an amount of jitter detected in a target track with a reference value; before performing tilt compensation and when the amount of the jitter exceeds the reference value, determining a direction of tilt compensation to be in a direction towards/away from a track of the optical recording medium to be reproduced; and resuming reproduction of the optical recording medium after performing the tilt compensation so that the jitter decreases in the direction of the determined tilt compensation.

BRIEF DESCRIPTION OF THE DRAWINGS

The above and/or other aspects and advantages of the present invention will become more apparent by describing in detail exemplary embodiments thereof with reference to the accompanying drawings in which.

DETAILED DESCRIPTION OF THE EMBODIMENTS

Figure 1:
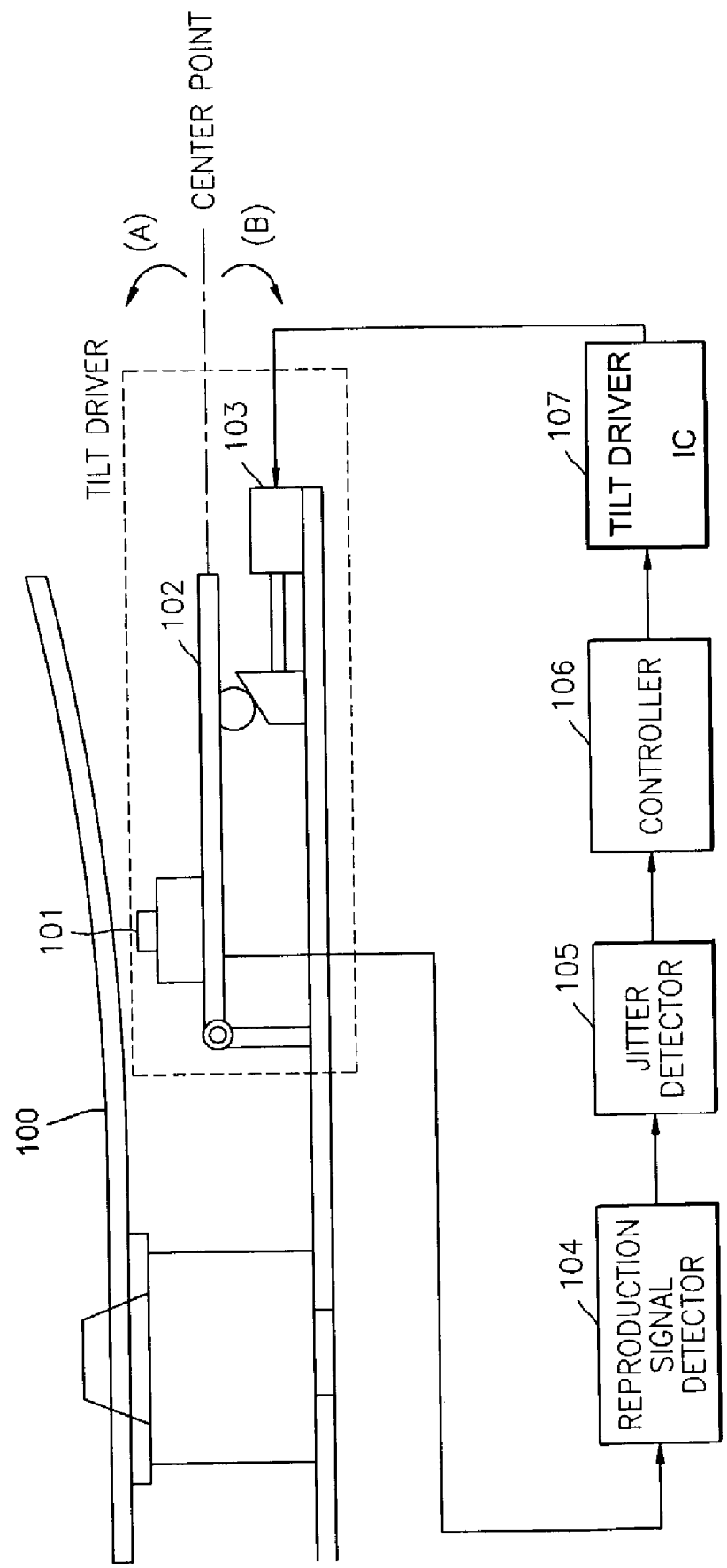
FIG. 1 is a schematic diagram showing the configuration of an apparatus which compensates for tilt, according to an embodiment of the present invention.

The present invention now will be described in detail with reference to accompanying drawings, wherein like reference numerals refer to the like elements throughout. The embodiments are described below in order to explain the present invention by referring to the figures.

FIG. 1 is a schematic diagram showing the configuration of an apparatus which compensates for tilt, according to an embodiment of the present invention. The apparatus which compensates for the tilt of an optical disk 100 includes an optical pickup 101, a guide 102, a tilt motor 103, a reproduction signal detector 104, a jitter detector 105, a controller 106, and a tilt driving integrated circuit (IC) 107. The optical pickup 101, the guide 102, and the tilt motor 103 generally comprise the tilt driver of the present invention.

Figure 2:
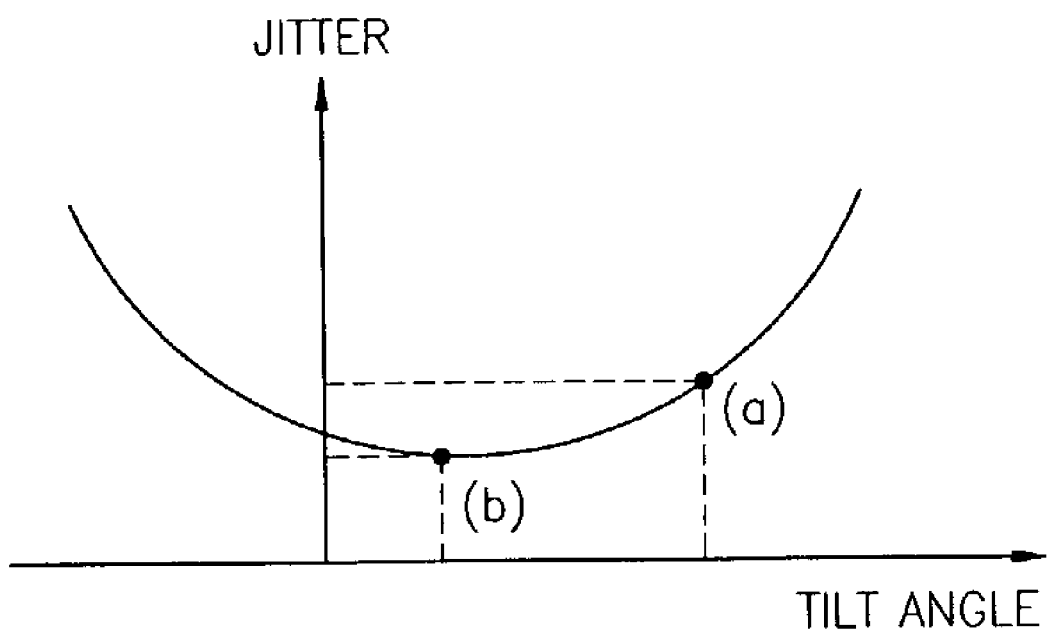
FIG. 2 is a graph showing the relationship between tilt angles and jitter.

FIG. 2 is a graph showing the relationship between tilt angles and jitter.

Figure 3:
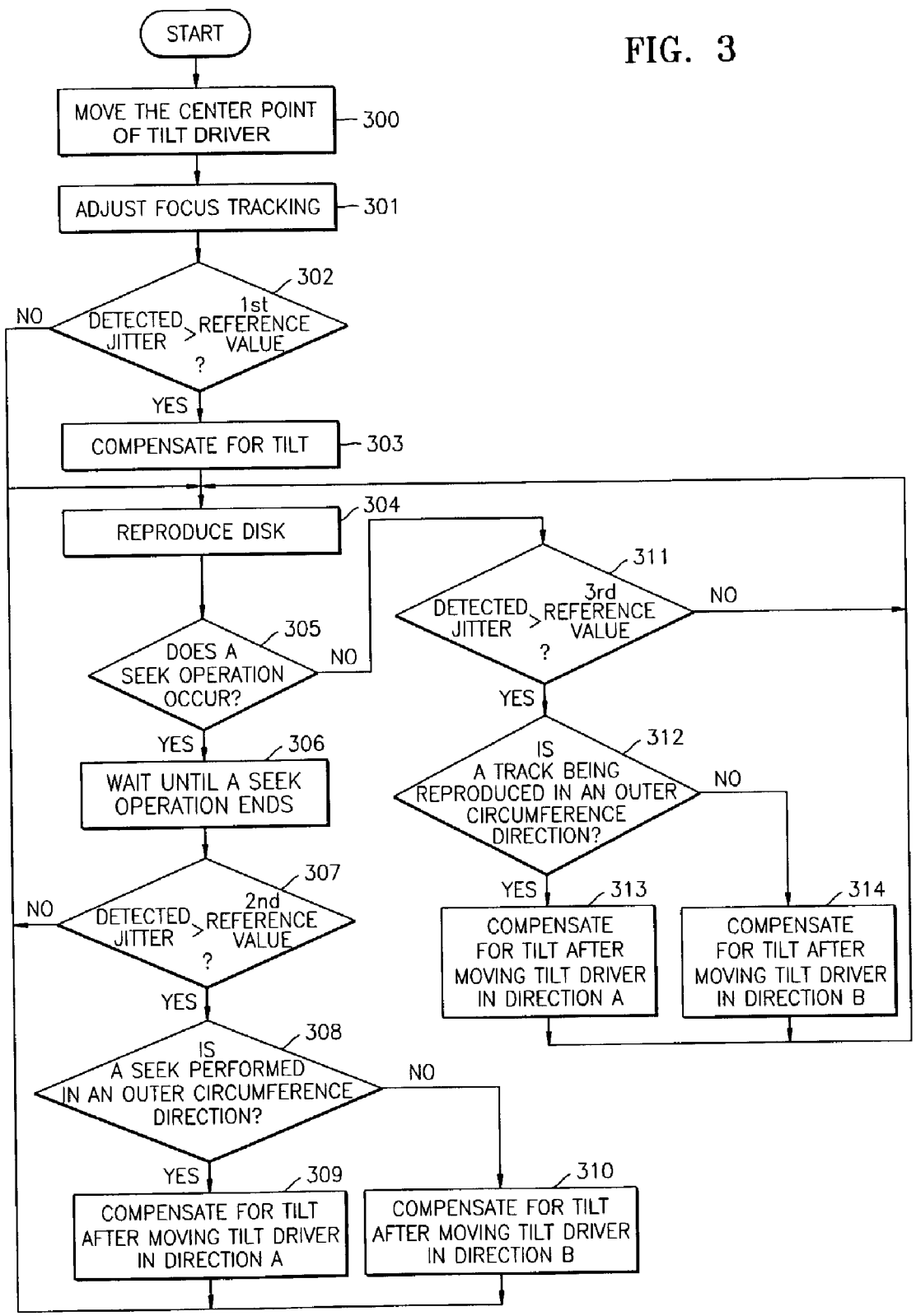
FIG. 3 is a flowchart showing a method of compensating for tilt, according to an embodiment of the present invention.

FIG. 3 is a flowchart showing a method of compensating for tilt, according to an embodiment of the present invention. The method comprises moving a tilt driver to a center point in operation 300 and adjusting focus tracking in operation 301. If it is determined that the detected amount of jitter is larger than a first reference value in operation 302, the tilt is compensated in operation 303. The disk is reproduced in operation 304. If it is determined that a seek operation occurs in operation 305, it is waited until the seek operation is completed in operation 306. If it is determined that the detected amount of the jitter is larger than a second reference value in operation 307, it is determined if a seek operation is performed in an outer circumference direction. If the seek operation is performed in the outer circumference, the tilt compensation is performed after moving the tilt driver in direction A of FIG. 1 in operation 309. The tilt compensation after moving the tilt driver in direction B of FIG. 1 direction in operation 310 if the seek operation is not performed at the outer circumference direction.

If the seek operation does not occur as determined in operation 305, it is determined if the detected amount of jitter is larger than a third reference value in operation 311. If the detected amount of the jitter is larger, it is determined if a track is reproduced in an outer circumference direction in operation 312. If so, the tilt compensation is performed after moving the tilt driver in direction A of FIG. 1 in operation 313. If it is determined that the track is not reproduced in the outer circumference direction, the tilt compensation is performed after moving the tilt driver in direction B of FIG. 1 in operation 314.

The present invention now will be described in detail with reference to FIGS. 1 through FIG. 3.

Referring to FIGS. 1 and 2, an apparatus which compensates for tilt has a dish shape if an optical disk 100 is mounted on a reproducing device. The optical pickup 101 reads signals from the optical disk 100. If the optical disk 100 is mounted on the reproducing device, the optical pickup 101 is positioned at an initial read-in region of the optical disk 100, and a tilt driver is positioned at a center point of a driving range. For the shown embodiment, the driving range is the range that a guide 102 can move in upward and downward directions. The center point of the driving range is an average of the distance that the guide 102 can move in the upward and downward directions. If the tilt driver is positioned at the center point of the driving range, focus tracking is adjusted to an optimal state. It is understood that other ranges and/or center points can be used.

In the present invention, tilt compensation is performed by detecting the jitter before or when the optical disk 100 is reproduced. Here, the state before the optical disk 100 is reproduced refers to a state where an image is not displayed but the optical disk 100 is operated. The state where the optical disk 100 is being reproduced refers to a state where an image is displayed. The state before the optical disk 100 is reproduced may also refer to where other types of data are not reproduced (data, audio), and reproduction can refer to a state where the other types of data are read to be output.

First will be described the performance of tilt compensation by detecting the jitter before the optical disk 100 is reproduced. The optical pickup 101 reads signals recorded on the operating optical disk 100, and the reproduction signal detector 104 detects only reproduction signals among the signals read by the optical pickup 101. The jitter detector 105 detects the amount of the jitter in the reproduction signals detected by the reproduction signal detector 104. The detected amount of the jitter is input into a controller 106.

The controller 106 (not shown) comprises a storage unit which stores reference amounts of the jitter in cases where a reproduction or a seek operation is performed, a comparator to compare the detected amount of the jitter detected by the jitter detector 105 with the reference amount of the jitter stored in the storage, and a tilt controller to control a tilt driver according to the comparison results. The controller 106 uses the comparator to compare the amount of the jitter detected by the jitter detector 105 with the reference amount of the jitter stored in the storage unit. If the detected amount is larger than the reference amount, the controller 106 transmits a signal which minimizes the amount to the tilt driving integrated circuit (IC) 107. The tilt driving IC 107 operates the tilt driver. While not required in all aspects of the invention, the controller 106 can comprise a general or special purpose computer encoded with instructions for performing tilt compensation.

Next will be described the performance of the tilt compensation by detecting the jitter when the optical disk 100 is being reproduced. If the optical disk 100 is reproduced after compensating for the tilt by detecting the jitter before the optical disk 100 is reproduced, the controller 106 monitors the jitter of the reproduction signal over a certain time period. When the optical disk 100 is reproduced, the jitter continuously changes. The optical disk 100 reads signals recorded on the optical disk 100 during reproduction, and the reproduction signal detector 104 detects only the reproduction signals among the signals read by the optical pickup 101. The jitter detector 105 detects the amount of the jitter in the reproduction signals. The detected amount of jitter is input to the controller 106.

The controller 106 compares the detected amount of the jitter during reproduction over a certain time period with a reference amount of the jitter stored in a storage unit. If the detected amount is larger than the reference amount, the controller 106 detects a need for tilt compensation. The controller 106 determines an initial direction of the tilt driver before starting tilt compensation.

Specifically, if the optical disk 100 is reproduced continuously in an outer circumference of a track, the controller 106 controls the tilt driver to move in a direction A of FIG.

1 from a center point. If the optical disk 100 is continuously reproduced in an inner circumference direction of a track, the controller 106 controls the tilt driver to move the center point in the direction B. Direction A of FIG. 1 refers to a direction in which the radial direction angle of the pickup 101 increases upwardly from a disk surface (i.e., the pickup 101 rotates towards the disk surface being reproduced). Conversely, the direction B of FIG. 1 refers to a direction in which the radial direction angle of the pickup 101 increases downwardly from the disk surface (i.e., the pickup 101 rotates away from the disk surface being reproduced). Each of the directions A and B has a maximum and a minimum.

The controller 106 starts the tilt compensation after determining the initial direction of the tilt driver. The controller 106 transmits a tilt compensation signal which reduces the amount of jitter to a minimum to a tilt driving IC 107, and the tilt driving IC 107 operates the tilt driver.

In a seek/chapter search where an optical pickup 100 during reproduction goes beyond a value fixed by a user, the tilt compensation is performed when the optical pickup 101 reaches a target value/track. The controller 106 compares the amount of the jitter detected when the optical pickup 100 reaches the target track with a reference amount of the jitter stored in the storage unit. If the detected amount is larger than the reference amount, the controller 106 detects a need for tilt compensation.

Specifically, the controller 106 determines the initial direction of the tilt driver before starting tilt compensation. If the optical disk 100 moves in the outer circumference direction of the track over a fixed value, the controller 106 controls the tilt driver to move in the direction A from the center point. If the optical disk 100 moves in the inner circumference direction of the track over a fixed value, the controller 106 controls the tilt driver to move in the direction B. The controller 106 transmits a tilt compensation signal which minimizes the amount of the jitter and resumes tilt compensation to the tilt driving IC 107, and the tilt driving IC 107 operates the tilt driver. If tilt compensation is completed, the operation for reproducing the optical disk 100 resumes.

A method of tilt compensation is described with reference to FIGS. 1 and 3. The tilt driver is moved into the center point in operation 300. If the optical disk 100 is mounted on the reproduction apparatus, the optical pickup 101 is positioned at the initial read-in region of the optical disk 100, and the tilt driver is positioned at the center point of the driving range. Here, the driving range is the rate that the guide 102 can move in the upward and downward directions, and the center point refers to the average of the distance that the guide 102 can move in the upward and downward directions.

If the tilt driver is positioned at the center point of the driving range, the tilt driver adjusts the focus tracking to an optimal state (operation 301). The detected amount of the jitter is compared with a first reference value. If the detected amount is larger than the first reference value, the tilt compensation is performed (operations 302 and 303).

Specifically, the jitter detector 105 detects the amount of jitter in the reproduction signals. The detected amount of the jitter is input to the controller 106. The controller 106 compares the detected amount with the first reference amount. If the detected amount is larger than the first reference amount, a signal which minimizes the amount of the jitter is transferred to the tilt driving IC 107, and the tilt driving IC 107 operates the tilt driver (operation 303).

If the tilt compensation is completed before reproduction in operation 303, the focus tracking is adjusted, or if it is determined that the detected amount is not greater than the first reference amount, the optical disk 100 is reproduced (operation 304). If the seek operation occurs, the controller 106 waits until the seek operation is completed (operations 305 and 306). In a seek/chapter search where an optical pickup 100 during reproduction goes beyond a value fixed by a user, the controller 106 waits until the optical pickup 101 reaches a target track (operation 306).

After the seek operation is completed (in other words, after the optical pickup 101 reaches a target track), the amount of the jitter detected in the target track is compared with the second reference value in operation 307. Depending on the comparison result, it is determined if the tilt compensation is to be performed and an initial movement direction of the tilt driver is determined (operations 307 through 310).

Specifically, if the detected amount is not greater than the second reference value, the optical disk 100 is reproduced in operation 304. If the detected amount is larger than the second reference value, it is determined if the optical disk performs the seek operation in the outer circumference direction in order to determine the initial movement direction of the tilt driver (operation 308). Where the optical disk 100 performs the seek operation in the outer circumference direction of the track, the controller 106 performs the tilt compensation after the tilt driver moves in the direction A of FIG. 1 from the center point (operation 309). Where the optical disk 100 performs the seek operation in the inner circumference direction of the track, the controller 106 performs tilt compensation after the tilt driver moves in direction B from the center point (operation 310). The controller 106 transmits a correction tilt signal, which minimizes the amount of the jitter, to the tilt driving IC 107, and the tilt driving IC 107 operates the tilt driver. When the operation of the tilt compensation has been completed, reproduction of the optical disk 100 resumes (operation 304).

Where it is determined that the seek operation is not performed in operation 305, the amount of the jitter is determined in a predetermined cycle of time and compared with a third reference value (operation 311). Specifically, it is determined if the tilt compensation is to be performed, and the initial movement direction of the tilt driver is determined. If the amount of jitter determined in the target track is larger than the third reference value, it is determined if the optical disk is reproduced in an outer circumference direction in order to determines the initial movement direction of the tilt driver for tilt compensation (operations 311 and 312).

Where the optical disk 100 performs reproduction in the outer circumference direction of a track, the controller 106 moves the tilt driver from the center point toward the direction A and performs the tilt compensation (operation 313). Where the optical disk 100 is reproduced in the inner circumference direction of the track, the controller 106 performs tilt compensation after the tilt driver moves in direction B from the center point (operation 314). The controller 106 transmits a correction tilt signal, which minimizes the amount of the jitter, to the tilt driving IC 107, and the tilt driving IC 107 operates the tilt driver. When the operation of the tilt compensation has completed, reproduction of the optical disk 100 resumes (operation 304).

As described above, according to the present invention, it is possible to reduce the time required to compensate for tilt by determining the initial movement direction of a tilt driver before compensating for tilt, and it is possible to not interrupt the operation of a reproducer during tilt compensation.

Although a few embodiments of the present invention have been shown and described, it will be understood by those skilled in the art that various changes in form and details may be made therein without departing from the spirit and scope of the invention as defined in the claims and their equivalents.

What is claimed is:

1. An apparatus which compensates for tilt in an optical recording medium driver which drives an optical recording medium, the apparatus comprising:
   an optical pickup unit to generate a reproduction signal using the optical recording medium;
   a tilt adjuster to adjust a tilt of the optical pickup unit;
   a jitter detector to detect an amount of jitter in the reproduction signal; and
   a tilt controller which, before performing tilt compensation and when the detected amount of the jitter detected over a certain period of time exceeds a reference value during reproduction of the optical recording medium, controls the tilt compensation to be in a direction in which the amount of the jitter decreases after adjusting an operational direction of the tilt adjuster to be in a direction towards/away from a track of the optical recording medium to be reproduced,
   wherein the reference value comprises:
      a first reference value where the detected amount of jitter occurs after a seek operation, and
      a second reference value if the detected amount of jitter occurs where no seek operation is performed.

2. The apparatus of claim 1, wherein the tilt controller comprises:
   a storage unit to store a reference amount of the jitter occurring when the optical recording medium is reproduced;
   a comparator to compare the detected amount of the jitter with the stored reference amount; and
   a controller which, if the detected amount of jitter is larger than the reference amount, controls the operational direction of the tilt adjuster so that the amount of the jitter is minimized.

3. The apparatus of claim 1, wherein the tilt controller operates such that, when the track of the optical recording medium is reproduced in an outer circumference direction, the optical pickup is moved in a radial direction whose angle increases in an upward direction toward a reproduced surface of the optical recording medium, before performing the tilt compensation.

4. The apparatus of claim 1, wherein the tilt controller operates such that, when the track of the optical recording medium is reproduced in an inner circumference direction, the optical pickup is moved in a radial direction whose angle increases in a downward direction from a reproduced surface of the optical recording medium before performing the tilt compensation.

5. An apparatus which compensates for tilt in an optical recording medium driver which drives an optical recording medium, the apparatus comprising:
   an optical pickup unit to generate a reproduction signal using the optical recording medium;
   a tilt adjuster to adjust the tilt of the optical pickup unit;
   a jitter detector to detect an amount of jitter in the reproduction signal; and
   a tilt controller which, when the detected amount of the jitter detected in a target track exceeds a reference value when the optical recording medium is reproduced and before performing the tilt compensation, controls tilt compensation in a direction towards/away from a track of the optical recording medium to be reproduced,
   wherein the reference value comprises:
      a first reference value where the detected amount of the jitter occurs after a seek operation, and
      a second reference value if the detected amounted of the jitter occurs where no seek operation is performed.

6. The apparatus of claim 5, wherein the tilt controller comprises:
   a storage unit to store the reference amount of the jitter occurring when the track of the optical recording medium moves beyond a fixed value;
   a comparator to compare the detected amount of the jitter with the stored reference amount; and
   a controller which, if the detected amount of the jitter is larger than the stored reference amount and before performing the tilt compensation, controls the operation of the tilt adjuster to move in the direction towards/away from the track of the optical recording medium.

7. The apparatus of claim 5, wherein the tilt controller operates such that, before performing tilt compensation and when the track of the optical recording medium is reproduced in an outer circumference direction, the optical pickup is moved in a radial direction in which an angle increases in an upward direction toward a reproduced surface of the optical recording medium.

8. The apparatus of claim 5, wherein the tilt controller operates such that, when before performing tilt compensation and the track of the optical recording medium is reproduced in an inner circumference direction, the optical pickup is moved in a radial direction in which an angle increases in a downward direction from a reproduced surface of the optical recording medium.

9. A method of compensating for tilt in an apparatus used to drive an optical recording medium, the method comprising:
   comparing a reference value with an amount of jitter detected over a certain period of time when the optical recording medium is reproduced;
   when the detected amount of the jitter exceeds the reference value and before performing the tilt compensation, determining a direction of tilt compensation to be in a direction towards/away from a track of the optical recording medium to be reproduced; and
   resuming reproduction of the optical recording medium after performing the tilt compensation so that the jitter decreases in the direction of the determined tilt compensation,
   wherein the reference value comprises:
      a first reference value where the detected amount of the jitter occurs after a seek operation, and
      a second reference value if the detected amounted of the jitter occurs where no seek operation is performed.

10. The method of claim 9, wherein the direction of the tilt compensation is determined such that, when a track of the optical recording medium is reproduced in an outer circumference direction in the determining the direction of the tilt compensation and before performing the tilt compensation, an optical pickup is moved in a radial direction in which an angle increases upwardly towards a reproduced surface.

11. The method of claim 9, wherein, when a track of the optical recording medium is reproduced in an inner circumference direction in the determining the direction of tilt compensation and before performing the tilt compensation, the direction of the tilt compensation is determined such that an optical pickup moves in a radial direction in which an angle increases downwardly from a reproduced surface.

12. A method of compensating for tilt in an apparatus used to drive an optical recording medium, the method comprising:
    comparing a reference value with an amount of jitter detected in a target track where a track moves beyond a predetermined value when the optical recording medium is reproduced;
    before performing the tilt compensation and when the detected amount of jitter detected exceeds the reference value, determining a direction of tilt compensation to be in a direction towards/away from a track of the optical recording medium to be reproduced; and
    resuming reproduction of the optical recording medium after performing the tilt compensation so that the jitter decreases in the direction of the determined tilt compensation,
    wherein the reference value comprises:
        a first reference value where the detected amount of the jitter occurs after a seek operation, and
        a second reference value if the detected amounted of the jitter occurs where no seek operation is performed.

13. The method of claim 12, wherein, when the track of the optical recording medium is reproduced in an outer circumference direction in the determining the direction of tilt compensation and before performing the tilt compensation, the direction of the tilt compensation is determined such that an optical pickup moves in a radial direction in which an angle increases upwardly towards a reproduced surface.

14. The method of claim 12, wherein, when a track of the optical recording medium is reproduced in an inner circumference direction in the determining the direction of tilt compensation and before performing the tilt compensation, the direction of the tilt compensation is determined such that an optical pickup moves in a radial direction in which an angle increases downwardly from a reproduced surface.

15. A recording and/or reproducing apparatus for use with an optical recording medium, the apparatus comprising:
    an optical pickup which generates a signal using the optical recording medium;
    a jitter detector which detects jitter in the generated signal;
    a controller which, prior to performing tilt compensation, selects a tilt compensation direction; and
    a tilt driver which drives the optical pickup to moves towards/away from a reproduced surface according to the selected tilt compensation direction,
    wherein the jitter is reduced as the optical pickup is moved in the selected tilt compensation direction,
    wherein the controller determines whether to perform the tilt compensation according to whether the detected jitter exceeds a reference value, and determines the tilt compensation direction when the detected jitter exceeds the reference value,
    wherein the reference value comprises:
        a first reference value where the detected jitter occurs after a seek operation, and
        a second reference value if the detected jitter occurs where no seek operation is performed.

16. The recording and/or reproducing apparatus of claim 15, wherein the controller determines the tilt compensation direction according to a location of a track from which the signal is generated.

17. The recording and/or reproducing apparatus of claim 16, wherein the controller determines the tilt compensation direction according to a relationship between the location of the track and a circumferential edge of the optical recording medium.

18. The recording and/or reproducing apparatus of claim 17, wherein the controller:
    determines whether the location of the track is in a first and a second region of the optical recording medium,
    selects the tilt compensation direction to move the optical pickup towards the reproduced surface when the track is in the first region, and
    selects the tilt compensation direction to move the optical pickup away from the reproduced surface when the track is in the second region.

19. The recording and/or reproducing apparatus of claim 18, wherein the first region is outside of the second region.

20. The recording and/or reproducing apparatus of claim 18, further comprising a turntable to receive the optical recording medium and which rotates the optical recording medium about a first rotational axis, wherein the tilt driver controls the optical pickup to be rotated towards or away from the reproduced surface about a second rotational axis perpendicular to the first rotational axis.

21. The recording and/or reproducing apparatus of claim 15, wherein the controller determines whether to perform the tilt compensation prior to generating a reproduction signal in which data is reproduced from the optical recording medium according to whether the detected jitter exceeds a reference value, and determines the tilt compensation direction when the detected jitter exceeds the reference value.

22. The recording and/or reproducing apparatus of claim 21, wherein the location of the track comprises an initial region of the optical recording medium which is used prior to generating the reproduction signal.

23. The recording and/or reproducing apparatus of claim 22, wherein the initial region of the optical recording medium comprises an initial read-in region of the optical recording medium.

24. The recording and/or reproducing apparatus of claim 15, wherein, during reproduction of the optical recording medium, the controller determines whether to perform the tilt compensation according to whether the detected jitter exceeds a reference value, and determines the tilt compensation direction when the detected jitter exceeds the reference value.

25. The recording and/or reproducing apparatus of claim 24, wherein, during the reproduction of the optical recording medium, the reference value comprises a first reference value where the detected jitter occurs after a seek operation, and comprises a second reference value if the detected jitter occurs where no seek operation is performed.

26. The recording and/or reproducing apparatus of claim 25, wherein, prior to generating a reproduction signal in which data is reproduced from the optical recording medium, the controller further determines whether to perform the tilt compensation according to whether the detected jitter exceeds a third reference value, and determines the tilt compensation direction when the detected jitter exceeds the reference value.

27. The recording and/or reproducing apparatus of claim 26, wherein, prior to generating the reproduction signal, the location of the track comprises an initial region of the optical recording medium which is used prior to generating the reproduction signal.

* * * * *

UNITED STATES PATENT AND TRADEMARK OFFICE
CERTIFICATE OF CORRECTION

| | |
|---|---|
| PATENT NO. | : 7,065,020 B2 |
| APPLICATION NO. | : 10/374501 |
| DATED | : June 20, 2006 |
| INVENTOR(S) | : Jee-hyung Park et al. |

It is certified that error appears in the above-identified patent and that said Letters Patent is hereby corrected as shown below:

Column 8, Line 6, after "detected" change "amounted" to --amount--.

Column 8, Line 53, after "detected" change "amounted" to --amount--.

Column 9, Line 20, after "amount of" delete "the".

Column 9, Line 22-23, after "detected" change "amounted of the" to --amount of--.

Column 9, Line 49, after "pickup to" change "moves" to --move--.

Signed and Sealed this

Twenty-eighth Day of November, 2006

JON W. DUDAS
*Director of the United States Patent and Trademark Office*